United States Patent

[11] 3,532,016

| | | |
|---|---|---|
| [72] | Inventor | Warren Zeph Lane<br>9 Apple Tree Lane, Darien, Connecticut 06820 |
| [21] | Appl. No. | 768,722 |
| [22] | Filed | Oct. 18, 1968 |
| [45] | Patented | Oct. 6, 1970 |

[54] METHOD AND APPARATUS FOR CUTTING AUTOGENOUS TISSUE FOR CARDIAC VALVE REPAIR
8 Claims, 6 Drawing Figs.

[52] U.S. Cl. .................................................. 83/175,
83/452, 83/462, 83/588, 83/637, 83/685, 83/926
[51] Int. Cl. ................................................... B26d 7/14
[50] Field of Search .......................................... 83/175, 18,
452, 462, 588, 637, 685, 926, 567, 382, 566

[56] References Cited
UNITED STATES PATENTS

| | | | |
|---|---|---|---|
| 1,476,669 | 12/1923 | D'Ardenne ............. | 83/452 |
| 2,355,556 | 8/1944 | Peterson ................ | 83/567X |
| 2,479,028 | 8/1949 | Stoneham .............. | 83/588X |
| 2,720,264 | 10/1955 | Taylor et al ........... | 83/637 |
| 3,297,015 | 1/1967 | Crawford ............... | 83/637X |

*Primary Examiner* — Frank T. Yost
*Attorney* — Robert Ames Norton

ABSTRACT: A machine is described for cutting out accurately from a piece of autogenous tissue shaped sections for the repair of cardiac valves. In the case of an aortic valve the tissue is cut in the shape of three cusps with a connecting strip which are then sutured to form a replacement aortic valve. In the case of sections for the repair of a mitral or tricuspid valve the sections are of different shape resembling crescents. The machine consists of two plates one carrying a male die and another a female die with means for stretching the tissue over the male die and spring loaded guide bars at each corner attached to the second plate and passing through holes in the first plate, the second plate carries a female die in an insert into which the male die fits and means are provided, such as a drill press, modified C clamp and the like for forcing the two plates into contact while accurately guided. The two dies cut the sections, cusps and a connecting strip for aortic valves, from the tissue without damaging the edges and maintain a precise size of cusps determined by the dimensions of the dies. Thus when sutured together for a replacement aortic valve always has perfect edges and the cusps are of exact dimensions. Several sizes of the dies are provided for different sized valves to fit different size human aortas.

Patented Oct. 6, 1970

INVENTOR.
WARREN ZEPH LANE

BY Robert Armer Norton

ATTORNEY

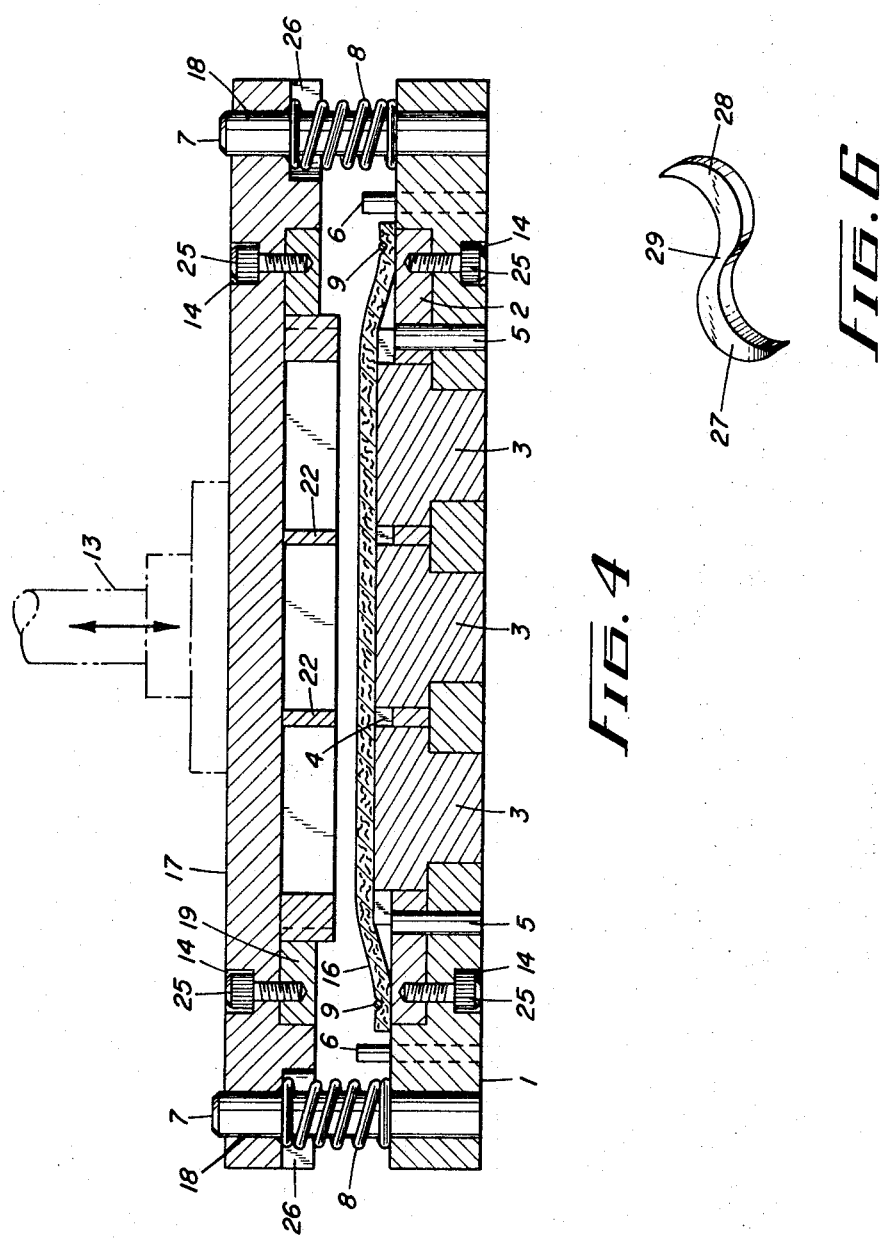

METHOD AND APPARATUS FOR CUTTING AUTOGENOUS TISSUE FOR CARDIAC VALVE REPAIR

BACKGROUND OF THE INVENTION

One of the serious results of infection, inflammation, or degenerations for example as a result of the aftermath of rheumatic heart disease, is that valves begin to leak and cardiac valve insufficiency results because of lesions on the edges of the valve sections. In the case of an aortic valve the lesions are, of course, on the edges of the cusps which come together to form the valve and prevent tight closure. As a result the valve no longer closes tightly and blood flows back from the aorta into the left ventricle reducing the effectiveness of the heart in circulating blood. As is the case with many similar lesions, inflammations or degeneration in parts of the heart, this condition never gets any better and often worsens to the point where a patient is unable to live a normal life or may even die.

As the results of developments on heart lung machines and cardiac surgery it is now quite common to cut out the shaped repair sections from a strip of the *fascia lata* taken from one of the patient's thighs. In the case of damaged aortic valve, the valve is excised and the new valve formed by suturing the three cusps and connecting strip to the wall of the aorta. In the case of sections cut out to repair the other valves, namely the mitral and tricuspid valve a portion of the valve is slit and the repair section is sutured in as a patch which causes the valve edges once more to close tightly. In the case of an aortic valve if the cusps have perfect edges and are of the right size so they fit together exactly, the new valve is just as good as a normal aortic valve and has resulted in more or less permanent alleviation of the valve lesions.

The problems encountered with aortic valves are by far the most serious because of the precise shapes of the cusps and connecting strip and because the stresses from the blood pressure are much greater in the case of the aortic valve. In the first place it is extremely difficult and in some cases almost impossible to cut clean straight edges of the cusps without damage to the edges and of precise size to fit together when sutured and form a tight valve. As a result it is often necessary to cut a number of sets of cusps before producing a usuable set. In an extreme case it might be necessary to remove a second strip from the patient's other thigh. This can result in a very serious additional problem because if at some future time further cardiac valve repair becomes necessary autogenous tissue sections are no longer available. Also if the edges of the cusps are damaged inflammation or even infection can set in and clots can develop. Sometimes the new valve becomes sufficiently damaged so that the operation has to be repeated at a later date. In spite of these drawbacks the above described method is the only one at present available and because of the dire necessity for replacement of the valve the drawbacks have been tolerated.

SUMMARY OF THE INVENTION

According to the present invention two rigid plates, for example of stainless steel, are provided with inserts one of which is a male die and the other a female die into which the male die can fit. Means are provided for stretching a piece of *fascia lata* from the patient's thigh over the male die and holding it in a stretched condition. The two plates are provided with spring loaded guiding rods at each corner and with suitable pin stops so the two dies can fit together with a penetration of the male die into the female die kept to a predetermined depth. After the tissue is stretched over the male die, the other plate with the female die aligned on the spring loaded guides, the two plates are pressed together by any suitable or convenient means. For example they may be placed in modified drill press or modified C clamps may be used and of course any other means of moving the two plates together for a predetermined penetration may be employed including pressing one plate manually. However in order to obtain uniform operation and maintain exact alignment mechanical means such as a drill press, C clamps and the like are preferred although other means for pressing the two plates together such as manual operation is not excluded from the broader aspect of the present invention.

The invention is not limited in its broader aspects to devices for cutting sections for aortic valve repair. However the problems of cutting the crescent shaped sections of tissue for repair patches on mitral or tricuspid valves are less serious, as these sections can be more easily cut manually. Nevertheless while the advantage of the present invention is at a maximum for cutting the three cusps and connecting strip for aortic valve repair practical operating advantages make the present invention useful also for the other shapes of tissue sections and they are of course included in the broad aspects of the invention. In general the only difference between sections for aortic valve repair and other sections is in the shape of the male and female dies used. The general design of the plates and the associated elements is not changed. Therefore for convenience and brevity the remainder of the general description will relate to the modification of the invention for aortic valve repair.

The edges of the male and female dies have sharp cutting corners and smooth edges which may, if desired, be highly polished such as by chrome plating or polished stainless steel. The result is an accurate precise cutting out of the three cusps without damaging the tissue edges and maintaining a precise shape and size. As a result the cusps with joining edge are always exact in size and with undamaged edges so that when sutured to form a new valve in the aorta the valve is always perfect and risk of edges becoming inflamed or infected resulting in lesions is substantially completely eliminated. Because the cusps for a replacement valve are always accurately cut it is normally never necessary to take a second strip from the patient's contra-lateral thigh.

As far as the materials of the plates and dies are concerned it is of course necessary that they be capable of very complete gas sterilization because the whole procedure has to be carried out under rigid aseptic conditions. Heat sterilization should be avoided because it can adversely affect the temper of the dies and destroy their sharp cutting edges. This also dictates the desirability of materials of construction which are not readily corroded. Stainless steel is very satisfactory and preferred for the main portion of the plates. The inserts with the dies can be of different material such as chrome plated carbon steel and the like, here of course the important thing is to have a material that is hard and holds a very sharp edge, or rather corners, and capable of taking a good polish so that the risks of injury to the edges of the cusps of tissues are eliminated.

While it is theoretically possible to change inserts in the plates when different sized cusps are needed, this is quite an operation as at least the male die is usually press fitted into the plate. Therefore the different sizes are best provided by having separate pairs of plates for each size. When after many months or even years of use a die becomes worn or the edges wear round, of course, inserts can be replaced with new dies. For the same reason separate plates having the correct dies for other shapes of tissue sections will be provided. In general precise dimensions of the crescent shaped tissue sections for other heart valves are not so critical as with the three cusps for the aortic valve and one size can be used for a larger number of heart sizes.

BRIEF DESCRIPTION OF THE DRAWINGS

FIG. 4 is a section through two plates;

FIG. 6 is a similar isometric view of crescent shaped tissue sections.

DESCRIPTION OF THE PREFERRED EMBODIMENTS

Figure 1:
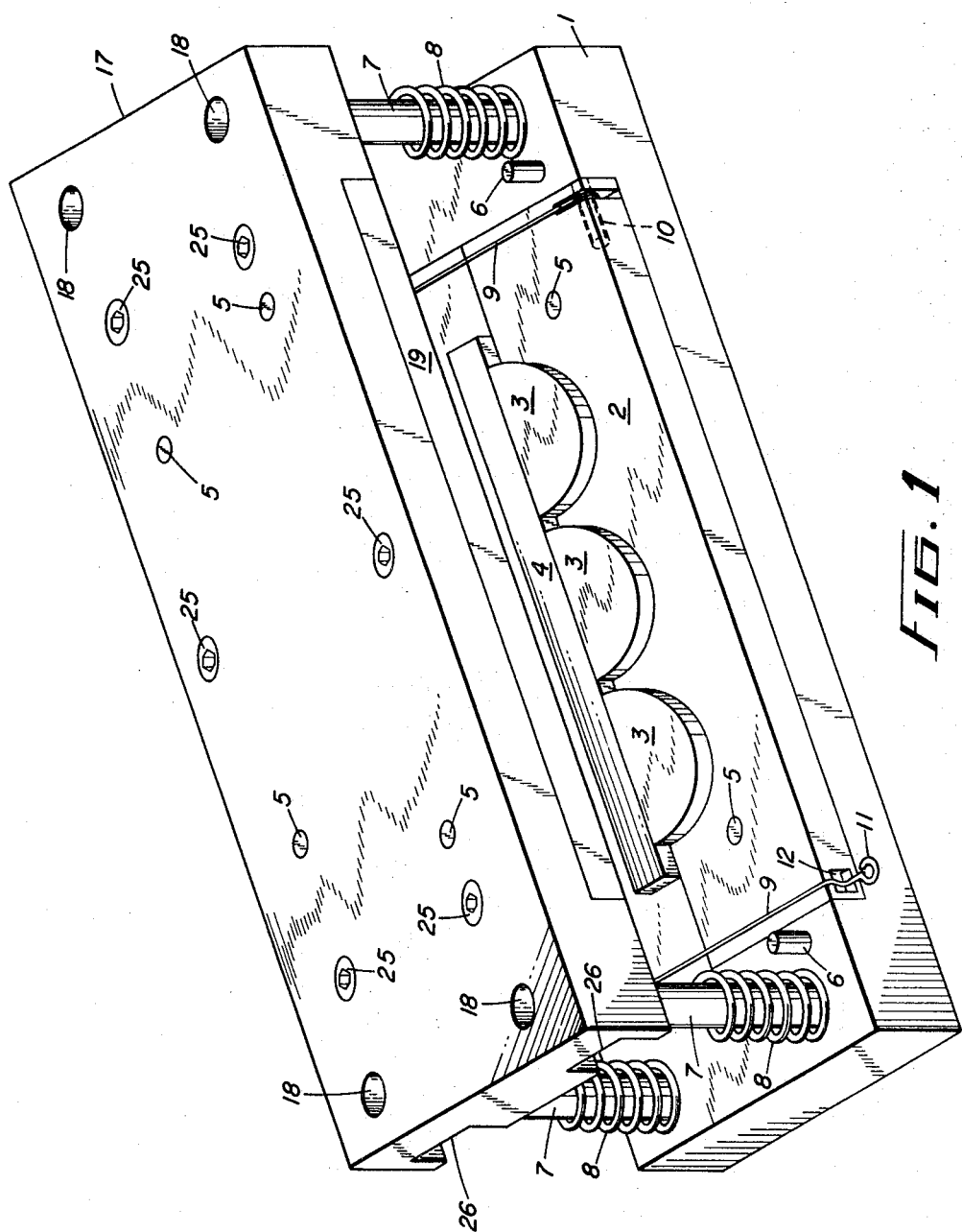
FIG. 1 is an isometric view of two plates on the guides with the upper plate just starting on the guides.

In FIG. 1 bottom plate is shown at 1 and is provided with an insert 2 having three cusp shaped projections 3 which are press fitted into the bottom plate. The insert is held in position by cap screws 14. The mounting of the insert is best seen in FIG. 4.

Figure 2:
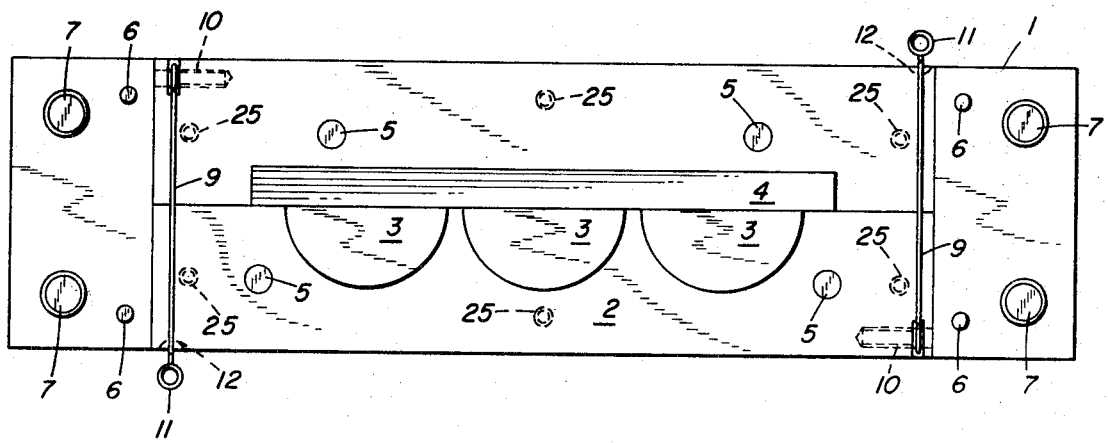
FIG. 2 is a plan view of the lower plate with the male die looking down from the top.

The bottom plate carries four polished guide rods 7, one at each corner, three of which are visible in FIG. 1 and all four in FIG. 2. The insert 2 carries a male die with cusp 3 and a straight portion 4. Depending on the size of the cusp and therefore of the valves which are to be made the width of the section 4 can vary from one-fourth inch for the smallest size to as much as one-half inch for the largest size.

When a piece of tissue, shown at 16 in FIG. 4, is stretched over the die elements 3 and 4 it is held at the end by two clamps 9 which are hinged at 10 and provided with curved ends 11. When they are snapped down over the tissue they snap into recesses 12 in the insert 2. This is most clearly shown in FIG. 1.

Figure 3:
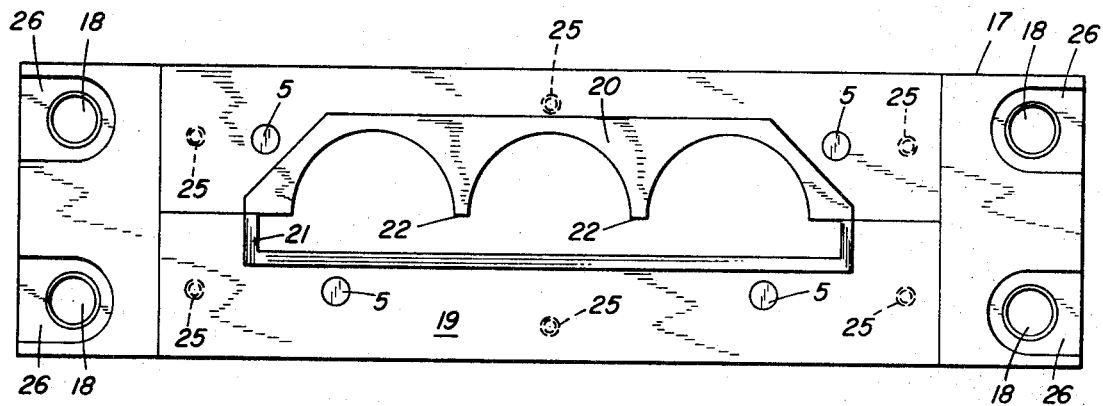
FIG. 3 is a plan view of the upper plate with the female die looking from the bottom.

The upper plate 17 is of course provided with holes 18 through which the guide rods 7 slide. Springs 8 are for the purpose of causing the plates to move apart after they have been pressed together to cut out the cusps. FIG. 3 shows most clearly the female die which is mounted in an insert 19 fastened to the top plate 17 by the cap screws 25. The fastening is clearly shown in FIG. 4. Both inserts are aligned by pins 5.

The insert 19 carries a female die with a cusped portion 20 and projecting portions 22 which with the edge of the die define a straight portion corresponding to the straight portion 4 of the male die shown in FIG. 2.

Figure 5:
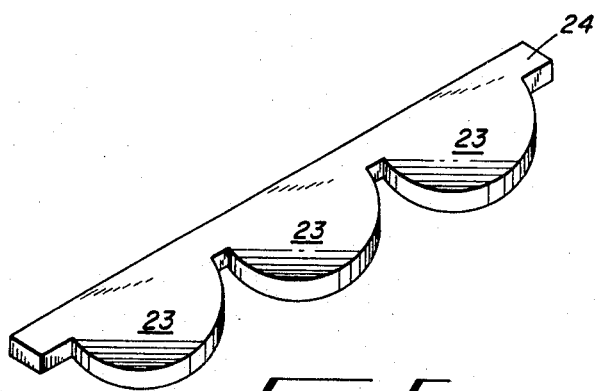
FIG. 5 is an isometric view of cusps of tissue cut out.

After the tissue 16 has been clamped in a stretched position on the male die as is shown in FIG. 4 the two plates 1 and 17 are pushed together by any suitable means, shown diagrammatically in FIG. 4 as a portion 13 of a drill press. The upper plate is pushed down compressing the springs 8 the tops of which compress into recesses 26 in the upper plate. The female die moves down and the male die penetrates it to a distance somewhat more than the thickness of the tissue. This cuts the tissue sharply and forms three cusps 23 and a straight portion 24 as shown in FIG. 5. The upper plate is prevented from moving too far down by the pins 6 which prevent the male die from projecting into the female die which could lacerate the edges of the cusps 23. Pressure is then released and the top plate 17 is raised by the springs 8. The top plate can then be slid off the guiding rods 7, the three cusps of tissue removed aseptically, the remains of the tissue 16 unclamped and removed and the device is then ready for sterilization and use in cutting another set of cusps for the next aortic valve to be replaced. As will be seen in FIG. 5 the sharp edges or corners of the two dies cut the cusps 23 accurately and leave them with smooth undamaged edges.

FIG. 6 shows a pair of crescent shaped pieces of tissue 27 and 28 which are of the proper shape for the repair of the other forms of heart valves. The two shaped pieces are connected together with a short piece of tissue 29 to maintain it taut across the male die. This is very easily cut with a sharp pair of scissors without producing damaged edges. Since the only difference involved with the different shapes is the requirement for different shaped dies, FIG. 6 shows only the shape of the piece of tissue cut. The plates and their associated elements are the same as in FIGS. 1 to 4 and are therefore not repeated with different shaped dies. While the crescent shapes shown in FIG. 6 can be cut more easily manually than the complicated shapes of the cusps for aortic valve repair the present invention makes possible rapid and accurate cutting of even the simpler shapes and of course the advantages of completely undamaged edges are retained.

I claim:

1. A device for cutting shaped pieces of tissue for repairing or replacing cardiac valves comprising in combination:
    a. a first plate having on its surface a male die of the proper shape with smooth, sharp cutting edges;
    b. means for clamping a piece of tissue in stretched position on the male die;
    c. a second plate provided with a female die into which the male die can fit when the plates are pressed together; and
    d. guiding means on which at least one of the plates move for aligning accurately the dies and maintaining substantial parallelism when the plates are moved together.

2. A device according to claim 1 in which the dies are shaped to cut three cusps with a connecting rib for the replacement of an aortic valve.

3. A device according to claim 2 in which the guide means are four rods, one at each corner of one plate and holes in the other plate through which the rods pass.

4. A device according to claim 3 in which the guide rods are provided with surrounding springs positioned to be compressed when the plates are pushed together and which force the plates apart thereafter.

5. A device according to claim 2 in which one of the plates is provided with pin stops so that when the plates are pressed together they stop at a point where the male die has entered the female die through predetermined distance.

6. A device according to claim 1 in which the guide means are four rods, one at each corner of one plate and holes in the other plate through which rods pass.

7. A device according to claim 6 in which the guide rods are provided with surrounding springs positioned to be compressed when the plates are pushed together and which force the plates apart thereafter.

8. A device according to claim 1 in which one of the plates is provided with pin stops so that when the plates are pressed together they stop at a point where the male die has entered the female die through predetermined distance.